July 1, 1947.  G. E. HOLTON  2,423,317
LEVEL MEASURING INSTRUMENT
Filed Dec. 6, 1943  4 Sheets-Sheet 4

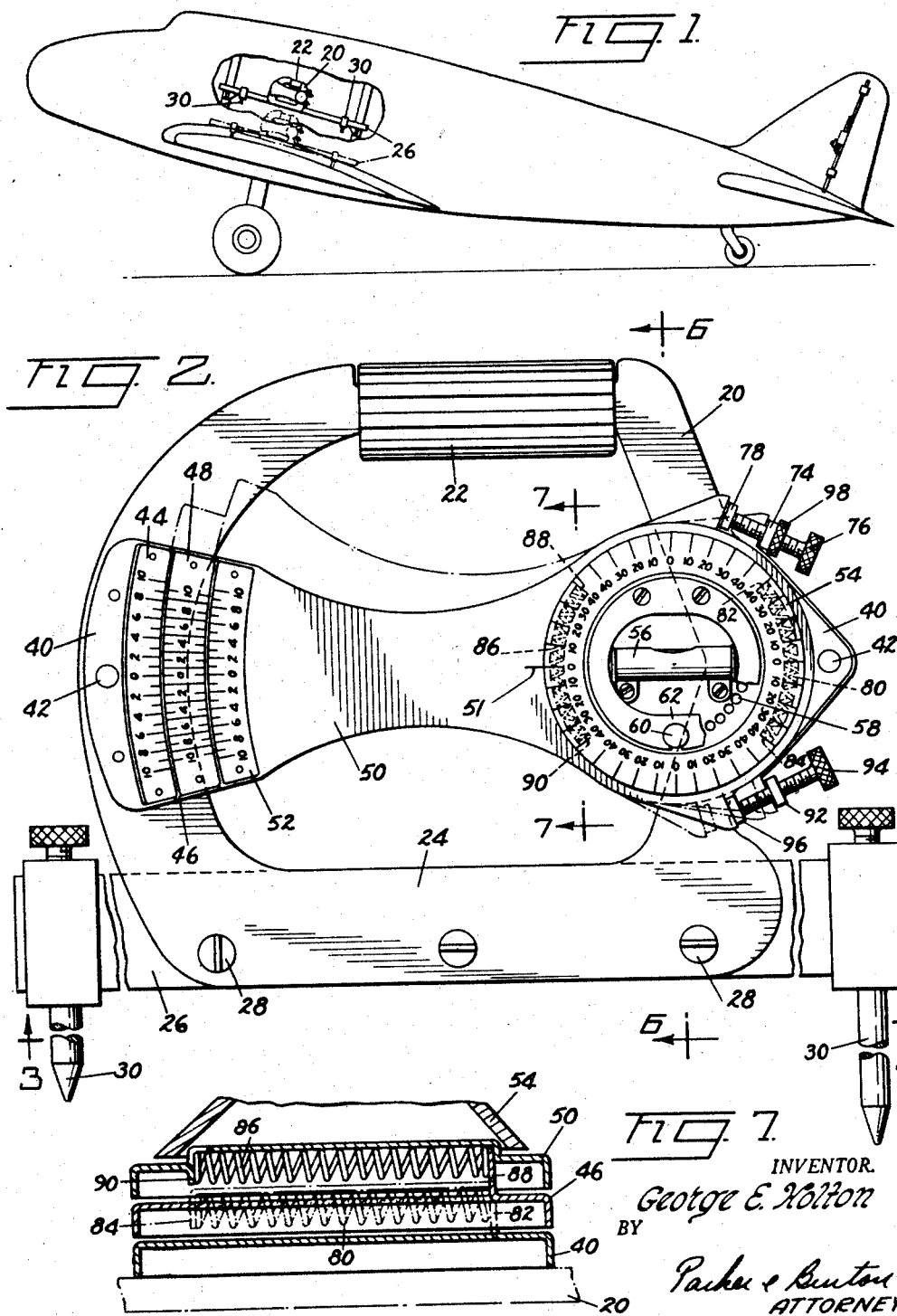

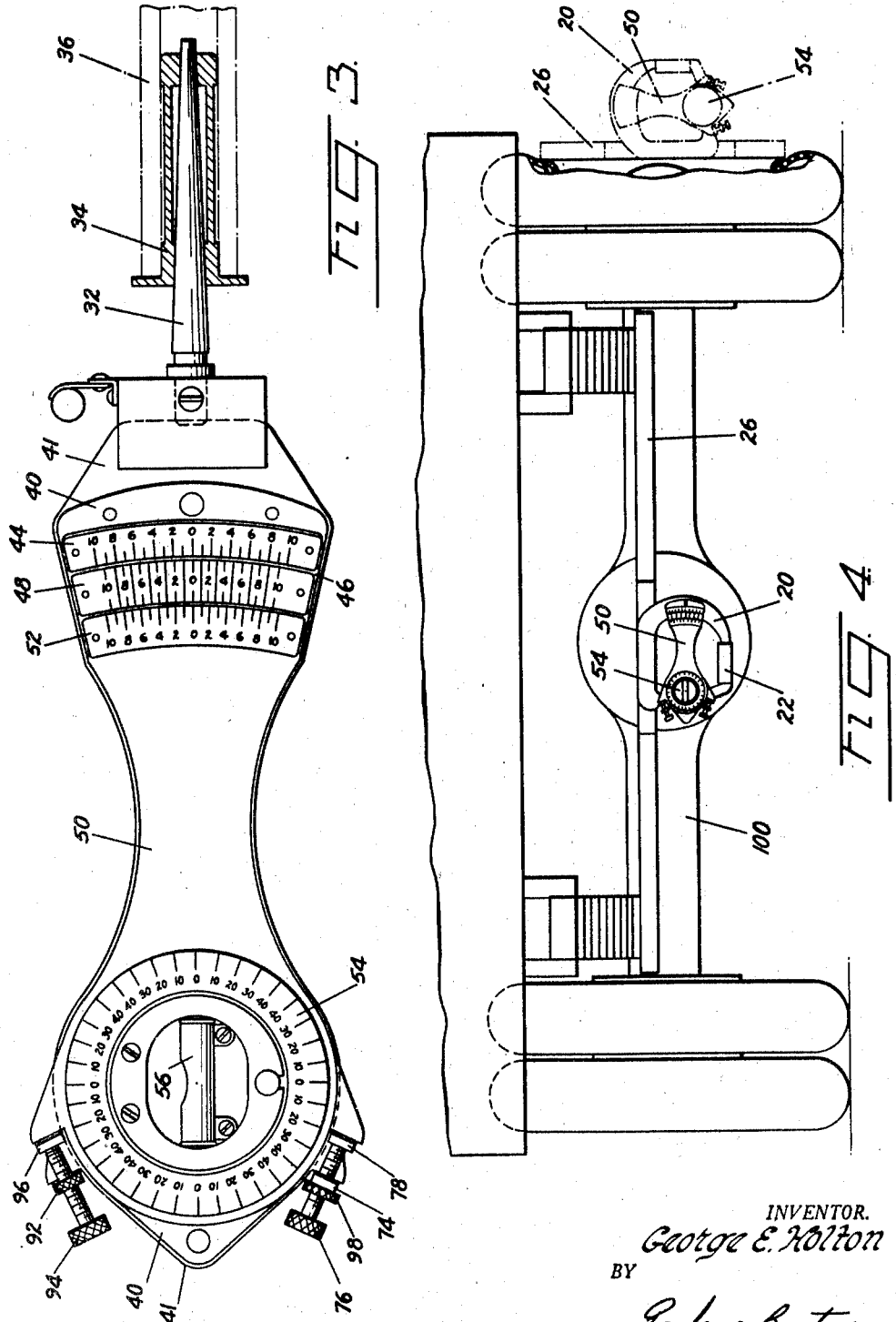

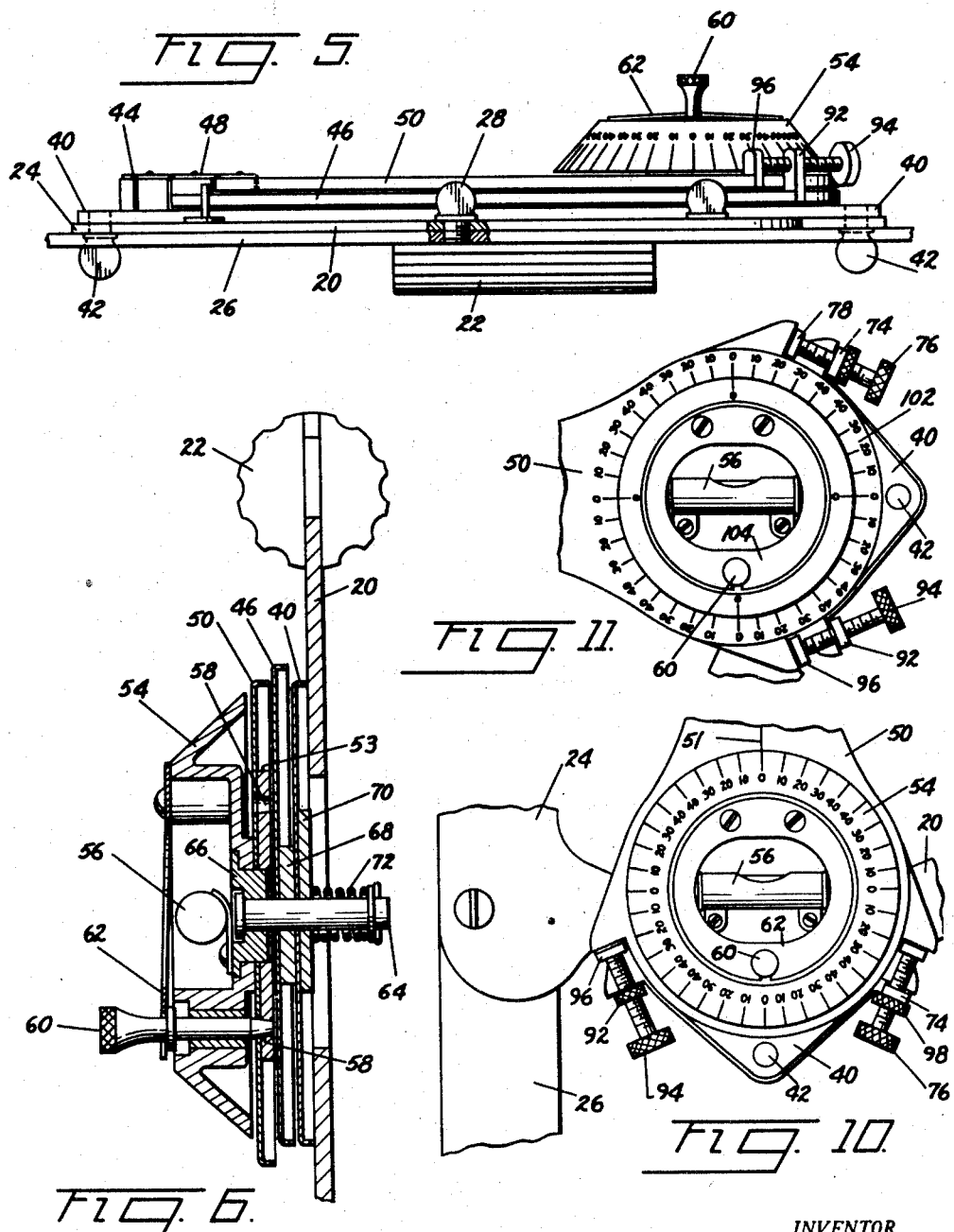

INVENTOR.
George E. Holton
BY
Parker & Painter
ATTORNEYS

Patented July 1, 1947

2,423,317

UNITED STATES PATENT OFFICE 2,423,317

LEVEL MEASURING INSTRUMENT

George E. Holton, Jackson, Mich., assignor to Hinckley-Myers Division of Kent-Moore Organization, Inc., Jackson, Mich., a corporation of Michigan Application December 6, 1943, Serial No. 513,011

5 Claims. (Cl. 33—214)

This invention relates to improvements in gauges or measuring instruments. More particularly it relates to an instrument for determining angular relationships, as for example the relative angular relationships of parts or surfaces of a vehicle such as an aeroplane, land vehicle, or other structure adapted to be supported at different positions some of which may vary from a true level position.

In determining the angular relationship of relatively angularly disposed parts or surfaces upon a vehicle, the angular relationship of the part or surface is determined relative to a fore and aft or amidships center line level on the vehicle. For example, an aeroplane is provided with what are known as fore and aft leveling lugs or brackets and also with transverse leveling brackets. These leveling brackets are located within the vehicle and the manufacturer's specification gives the particular angular disposition or relationship of various other parts and surfaces of the vehicle relative to these reference lines. On a motor vehicle, the camber of the wheels will be determined with respect to the axle which axle is the reference line for this determination.

When the vehicle is disposed truly level its level indicating brackets or reference line points are truly level. They are disposed parallel to the horizontal. It is then possible to measure the angular relationship of any part or surface with respect to these reference line points by determining the angular relationship of such part or surface as against a true level. Such determination may be made with a protractor device including a spirit level by making a direct reading upon the part or surface to be checked. Such reading determines the position thereof measured against the true level position inasmuch as the leveling brackets occupy a true level position; such reading also determines the angular relationship of the part or surface being checked with respect to the leveling brackets.

When the vehicle is not disposed in a true level position and its level indicating points are not parallel to the true horizontal but are disposed angularly with respect thereto a different situation is presented. It is then necessary to pursue either one of the two following methods. One method consists in first leveling up the vehicle. This is a laborious and time-consuming operation in the field. When the vehicle has been leveled a direct reading may be taken upon the part or surface to be checked as hereinabove described.

The second method is to first determine the angular variation of the level indicating points on the vehicle from the true level, and then determine the angular variation of the surface or part to be checked with respect to the true level. Upon making these determinations it is then possible to find through computation by adding or subtracting as may be necessary, the relative angular relationship of the surface checked with respect to the level indicating points on the vehicle. When a large number of parts or surfaces are to be checked against reference points on the vehicle, which reference points themselves do not occupy a true horizontal or vertical position, there is likelihood of confusion or error.

My improved instrument is designed to facilitate the determining of such angular measurements rapidly and with a minimum possibility of error. An object of my invention is to provide an instrument whereby the angular relationship of a part or surface with respect to a reference point on a vehicle may be directly read upon the instrument without additional mental computation and without leveling the vehicle and even though the vehicle and its reference points occupy positions which vary from the true horizontal or vertical by angles not known.

A further object of my invention is to provide an instrument of the character described having a compensating protractor scale upon which the relative angular relationship of the part checked with respect to a reference line on the vehicle is directly read. Such compensating protractor scale is angularly adjustable to compensate for variation of the reference line from a true line.

A meritorious feature is that the compensating protractor scale is what may be termed capable of being readily set at the desired position upon checking the actual position of the reference line on the vehicle as against its true position. Thereafter when the position of the part or surface to be checked is determined as against a true horizontal or vertical it is read on this compensated scale and the reading is direct. The reading is not of the angular relationship of the part being checked against the true horizontal but is rather against the actual position of the reference line on the vehicle as indicated by the compensated scale.

A further meritorious feature is that my improved scale is adapted for measuring angular relationships throughout a full 360 degrees. It may be used to measure angular relationship of vertical or horizontal surfaces or surfaces positioned at relative angular variations therefrom.

It is simple, rugged, compact and inexpensive and may be readily attached to any suitable adapter contact device designed to be fitted to any surface or part to check the position thereof.

As illustrated the instrument is adapted to read down to 1/10 of a degree. This is accomplished with vernier scales.

It is illustrated in the drawings as utilized in connection with measuring the surface relationships of parts on an aeroplane and also part relationships on a truck.

Other objects, advantages and meritorious features of this invention will more fully appear from the following description, appended claims and accompanying drawings wherein:

Figure 1 is a side elevation of an aeroplane partly broken away to show positioning of the instrument of the invention upon fore and aft leveling brackets within the plane and upon other parts or surfaces to be checked with respect thereto upon the plane.

Figure 2 is a side elevation of an instrument embodying my invention.

Figure 3 is a side elevation of my improved instrument provided with an adapter for a gun barrel to check the angular relationship of the gun with respect to a reference line upon the plane.

Figure 4 shows my improved instrument being employed in connection with checking the camber of a vehicle wheel relative to the center line of the axle.

Figure 5 is a bottom plan view of the instrument taken on line 3—3 of Figure 2.

Figure 6 is a sectional view taken on line 6—6 of Figure 2.

Figure 7 is a schematic sectional view through the pivoted ends of the scale arms.

Figure 10 is a side elevation of a fragment of the instrument showing the spirit level swung through an angle of 90° as compared with the position in Figure 2.

Figure 11 is a side elevation of a fragment of the instrument showing a modification of the structure.

Figure 8:
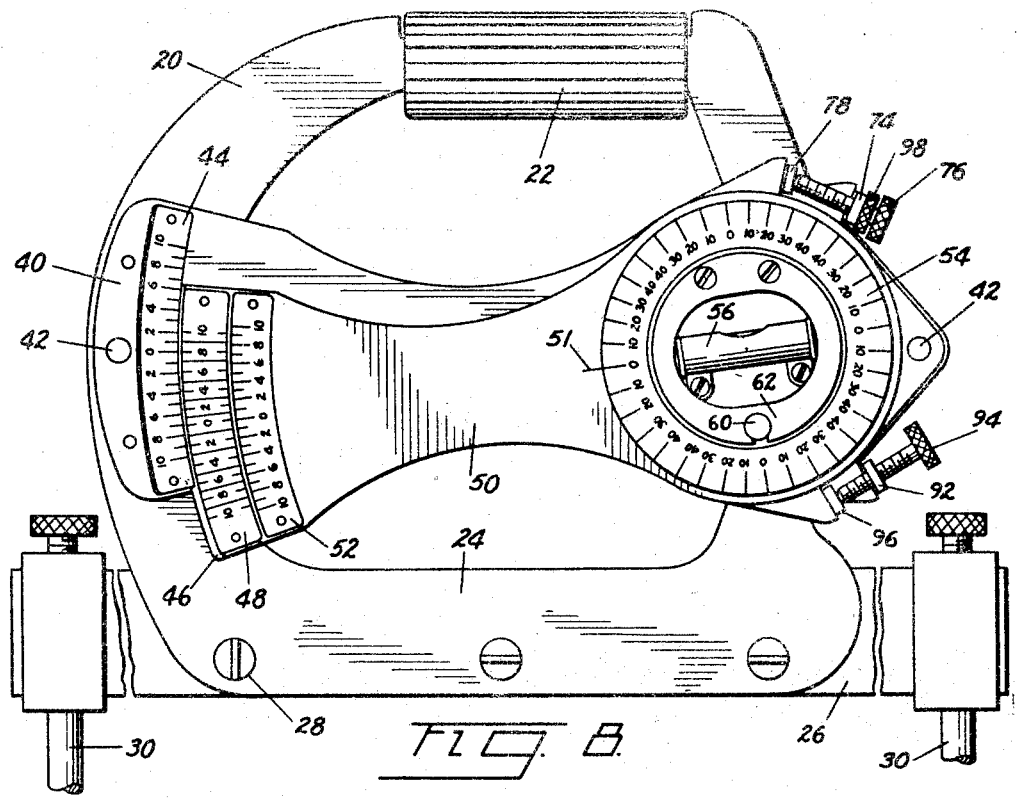
Figure 8 is a side elevation of the instrument of Figure 2 showing the scale arms as they might have been swung during the first step in an angular determination.
Figure 9:
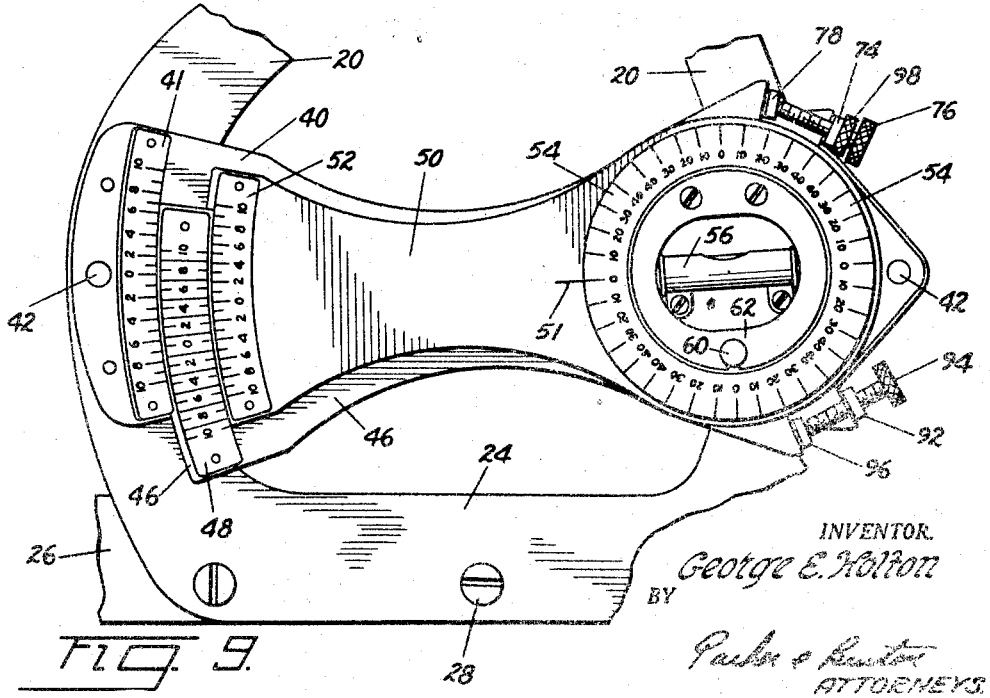
Figure 9 is a side elevation of the instrument of Figure 2 showing the scale arms as they might be disposed following the second step in an angular determination.

The instrument itself comprises a frame 20 having a hand grip portion 22 and an oppositely disposed base portion 24. A straight edge contact bar of any suitable length and indicated in the drawings as 26 may be secured by screws 28 to this base portion 24. The contact bar shown in Figure 2 is provided with adjustable contact pins 30.

In Figure 3 the instrument is shown as disconnected from the frame 20 and attached to an accessory plate 41, which plate is provided with a contact member 32 secured to one end thereof. This contact member is received within an adapter 34 which may in turn be received within the end of a gun barrel 36 as shown in Figure 3.

The contact member 32 and the contact member 26 are each referred to throughout the specification as contact members or even straight edge members because they perform that function in connection with supporting the instrument itself. It is through these contact members that the instrument is supported. If these contact members, when fitted to the parts to which they are adapted to be fitted, support the instrument in a true horizontal position the indication given by the instrument will be that of the true horizontal position.

The instrument includes a fixed base plate 40 which may be secured to the frame by screws 42 and which, as shown in Figure 2, bridges across the frame from one end to the other. This base plate is provided at one end with a vernier scale 44 fixed upon the base plate. This scale reads from an intermediate zero in opposite directions.

Pivotally supported on the base plate is a protractor scale arm 46. Secured to the outer end of this arm is a protractor scale 48 which reads in degrees in opposite directions from an intermediate zero as shown in Figure 2. In this figure the scale is shown as extending 10 degrees in each direction from the zero.

Also pivotally supported upon this plate 40 superposing the arm 46 is an indicator arm 50. The indicator arm is pivoted at one end to swing about a common axis with the arm 46. The indicator arm 50 carries at its outer end a vernier scale 52.

There is mounted upon the pivoted end of the indicator arm a disk 54 which is marked off in quarter segments of 90 degrees each, which collectively give a full 360 degree reading. Obviously this division into degrees might be a continuous one reading from zero to 360 degrees as it is also obvious that the degree scale 48 might extend more than 10 degrees on each side from the zero so long as it did not become too bulky for convenient use. The disk 54 carries a spirit level 56. The disk 54 and the spirit level which is carried thereby are pivotally supported for rotatable angular adjustment with respect to the indicator arm 50. The arm exhibits a reference line 51 (Figure 2).

In Figure 10 the disk is illustrated as rotated through an arc of 90° with respect to its relative position to the base as shown in Figure 2 and the instrument is also shown as shifted through an arc of 90° with respect to its position shown in Fig. 2. The indicator arm may be provided with a circular arrangement of locator apertures 58 as shown in Figure 2, and the disk provided with a locator pin 60 held by a spring 62 (Figure 6) so that the disk may be adjustably positioned angularly with respect to the arm. The locator apertures 58 are arranged 10 degrees apart. It is therefore evident that the spirit level may be adjusted in increments of 10 degrees angularly with respect to the indicator arm as measured by the degree disk 54.

The protractor scale arm, the indicator arm and the disk are all mounted upon the pivot pin 64 as shown in Figure 6, which pin not only extends through the base plate 40 of the instrument but also through spacer plates hereinbelow described. The disk 54 is provided with a hub portion 66 which is recessed to receive the head of the pin. The indicator arm 50 is rotatable about this hub portion. A spacer plate 53 underlies the arm 50 as shown in Figure 6. The protractor scale arm 46 is provided with a spacer plate 68 and is rotatably supported upon the pivot pin 64. A spacer plate 70 is shown underlying the base plate 40. A coil spring 72 encircles the pivot pin and is designed to hold the parts snugly together to prevent play or rattle while permitting swinging movement of the two arms about the pivot pin as an axis. This assembly of arms on the base plate 40 is held together by the pin 64 so that such unit may be removed from the frame 20 by release of the screws 42, and attached to any suitable accessory plate as 41 in Figure 3.

The base plate 40 is provided with an internally threaded lug 74 through which is threaded an adjustment thumb screw 76 which screw bears at its inner end against a lug 78 provided on the protector scale plate 46 as shown.

A coil spring 80 is disposed between the base plate 40 and the protractor scale plate 46, as shown particularly in Figure 7, and bears at one end against an ear 82 formed on the base plate and bears at the opposite end against an ear 84 formed on the protractor scale plate. Such spring tends to urge the protractor scale plate in a clockwise direction holding the lug 78 thereof against the adjustment screw 76. The screw may be actuated against the tension of the spring to urge the protractor scale plate in a counterclockwise direction.

A coil spring 86 is disposed between the protractor scale plate 46 and the indicator plate 50 as shown in Figure 7. One end of the spring bears against an ear 88 provided on the protractor scale plate. The opposite end of the spring bears against an ear 90 provided on the indicator plate. The spring tends to urge the indicator plate in a counter-clockwise direction with respect to the protractor scale plate. The protractor scale plate is provided with an internally threaded lug 92 through which is threaded an adjustment thumb screw 94. The end of the thumb screw bears against a lug 96 provided in the indicator plate. The thumb screw may be rotated to urge the indicator plate in a clockwise direction against the resistance of the spring 86.

The instrument may be mounted upon the frame as shown in Figure 2 and this frame provided with a straight edge member 26 and the straight edge contact portion of the frame may be positioned upon leveling brackets such as fore and aft leveling brackets shown on the aeroplane in Figure 1 in the broken away portion of the fuselage. The thumb screw 76 may now be rotated either to urge the protractor scale plate in counter-clockwise direction against the resistance of its spring 80 or the screw may be withdrawn so as to permit the arm under the impulse of the spring to move in a clockwise direction. There is a lock nut 98 on the thumb screw 76 which would have to be backed off from the position shown in Figure 2 to permit advancement of the screw.

The indicator arm 50 will move with the protractor scale arm 46 because of the interposition of the spring 86 between said arms. The thumb screw 76 will be rotated until the spirit level carried by the indicator arm shows the bubble as centered. The lock nut 98 may now be tightened to lock the protractor scale arm at this position. The protractor arm and the indicator arm may have been moved as shown in Figure 8 to bring the spirit level bubble to the centered position.

At the institution of the above described movement the zero of the protractor scale will have been aligned with the zero of the indicator scale and therefore at the conclusion of the above described movement and the locking of the protractor scale arm with the lock nut 98 the zero of the protractor scale will have been moved angularly with respect to the fixed scale on the base plate either in one direction or the other from its zero. This movement will indicate the angular variation of the leveling brackets from the true level position. If such a reading is desired it may be taken on the protractor degree scale and on the vernier on the fixed scale plate 44.

If, however, it is desired to determine the angular relation of some other surface of the plane such as the wing angle with respect to the fore and aft leveling brackets (and the determination of such relative angular relationships is the primary purpose of the instrument), this particular reading may be neglected and the indicator scale arm merely locked, as described, at the position indicated when the indicator arm spirit level showed a true horizontal reading. The protractor arm scale has now been compensated for the variation of the leveling brackets from the true level.

The instrument is now taken from the leveling brackets and positioned in contact with the surface or part which is to be checked, with the instrument disposed in the same relationship as it was on the leveling brackets. Assuming angular variation between the part being checked and the leveling brackets the thumb screw 94 will be rotated to swing the indicator arm 50 to center the bubble of the spirit level. Rotation of this thumb screw will urge the indicator arm 50, either under the direct impulse of the screw or under the pressure of the spring in one direction or the other. This angular movement will be measured by angular displacement of the scale 52 of the indicator arm with respect to the protractor scale 48 of the arm 46. It is apparent that the reading of the indicator scale 52 on the protractor scale 48 will be the reading of the angular variation of the part being checked with respect to the leveling brackets upon which the protractor scale was compensated. Such reading is direct and requires no additional computations.

If the variation to be measured is greater than 10 degrees which would carry it off of the degree scale on the protractor arm the disk 54 may be manipulated through 10 degree increments as desired and this reading must be taken into consideration in determining the angular variation of the part or surface being checked with respect to the leveling brackets. The disk 54 may be angularly rotated through 10 degree increments throughout the entire circumference of 360 degrees and it is, therefore, obvious that it may be rotated through an arc of 90 degrees so as to take readings against a vertical surface as well as a surface varying slightly from the horizontal.

In Figure 1 the instrument is shown as positioned on the fore and aft leveling brackets within the plane and also as fitted against the upper surface of the wing in a position varying slightly from the horizontal. It is also shown as applied to the vertical fin of the tail in which case it would be compensated from the transverse leveling brackets. In taking this reading the instrument is carried by a straight edge member 26.

In Figure 3 the instrument is shown as herein above described as employed in taking a reading of the angular relationship of the gun barrel which gun would be mounted on the plane. In this case the instrument is fitted with the contact member 32.

In Figure 4 the instrument is shown as applied first to the spring pads of axle 100 of the vehicle and then as applied to a wheel rim to indicate camber.

In Figure 11 is shown a slight modification wherein the 360 degree dial 102 is inscribed upon the indicator arm 50 itself and the spirit level 56 is carried by a ring mounting 104 which is rotatably supported by said arm for angular adjustment. The spirit level ring is provided with indicator zero marks adapted to indicate the position with respect to the dial.

What I claim is:

1. An instrument of the class described comprising a frame provided with a contact portion, an arm pivoted at one end to the frame for swinging movement and provided at the opposite end with a protractor scale, a second arm pivoted at one end upon the frame overlying the first arm and provided with an indicator adapted to traverse the protractor scale of the first arm, mechanism operable to swing both arms as a unit in opposite directions, said protractor scale arm adapted to be releasably locked at the position to which swung, said second arm adapted to be swung independently of the first arm to cause the indicator to traverse the scale of the first arm, and gravity responsive mechanism coupled with the second arm to indicate the true gravity determined position thereof.

2. An instrument of the class described comprising a frame provided with a contact portion, an arm pivoted at one end to the frame for swinging movement and provided at the opposite end with a protractor scale, a second arm pivoted at one end upon the frame overlying the first arm and provided with an indicator adapted to traverse the protractor scale of the first arm, spring means and screw mechanism operable to swing both arms as a unit, said protractor scale arm adapted to be releasably locked at the position to which swung, spring means and screw mechanism adapted to swing said second arm independently of the first arm to cause the indicator to traverse the protractor scale of the first arm, and gravity responsive mechanism carried by the second arm adapted to indicate a true gravity determined position, said gravity responsive mechanism being angularly adjustable with respect to the second arm.

3. An instrument of the class described comprising a frame provided with a straight edge portion and a fixed scale portion projecting angularly away from the straight edge, a scale arm pivoted at one end upon the frame to swing its opposite end to traverse the scale of the frame, a second scale arm pivoted at one end upon the frame coaxially with the first scale arm and swingable as a unit therewith to traverse the scale of the frame or swingable independently thereof to traverse the scale of the first arm, a leveling glass and dial element pivotally supported upon the frame coaxially with said two arms and swingable as a unit with said two arms to measure the angular displacement of said arms with respect to the scale of the frame or swingable as a unit with the second arm independently of the first arm to measure the angular displacement of the second arm with respect to the scale of the first arm or independently of said two arms.

4. An instrument of the class described comprising a frame exhibiting a base reference point and having a contact portion, a pair of scale arms and a leveling glass and dial element coaxially pivotally supported upon the frame for angular adjustment of said pair of arms and leveling glass and dial element to coincident positions in opposite directions with respect to said base reference point, means for locking one of said arms at said positions of angular displacement, said other arm and leveling glass and dial element being angularly displaceable in opposite directions with respect to said locked arm, said leveling glass and dial element being angularly displaceable with respect to said arms.

5. The invention described in claim numbered one (1) characterized in that means is provided for coupling said gravity responsive mechanism with said two arms to swing as a unit therewith or with said second arm to swing as a unit therewith independently of said first arm or to swing independently of said second arm, and means is provided for measuring the angular displacement of said gravity responsive mechanism with respect to said second arm.

GEORGE E. HOLTON.

REFERENCES CITED

The following references are of record in the file of this patent:

UNITED STATES PATENTS

| Number | Name | Date |
|---|---|---|
| 1,822,740 | Loeser | Sept. 8, 1931 |
| 2,074,108 | Graham | Mar. 16, 1937 |
| 2,072,779 | Torbert | Mar. 2, 1937 |
| 2,170,824 | Lichtenwalner | Aug. 29, 1939 |
| 1,974,006 | Bennett | Sept. 18, 1934 |

FOREIGN PATENTS

| Number | Country | Date |
|---|---|---|
| 317,275 | Germany | Dec. 13, 1919 |
| 436 | Great Britain | Jan. 7, 1909 |